US007950002B2

(12) United States Patent
Moore

(10) Patent No.: US 7,950,002 B2
(45) Date of Patent: May 24, 2011

(54) TESTING A SOFTWARE PRODUCT BY INITIATING A BREAKPOINT AND EXECUTING A PROBE ROUTINE

(75) Inventor: Richard J. Moore, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 1080 days.

(21) Appl. No.: 11/537,731

(22) Filed: Oct. 2, 2006

(65) Prior Publication Data

US 2008/0098362 A1 Apr. 24, 2008

(51) Int. Cl.
*G06F 9/44* (2006.01)

(52) U.S. Cl. ........................................................ 717/124

(58) Field of Classification Search ................... 717/124
See application file for complete search history.

(56) References Cited

U.S. PATENT DOCUMENTS

| 4,455,654 | A  | * | 6/1984  | Bhaskar et al. | 714/28  |
| 5,142,679 | A  | * | 8/1992  | Owaki et al.   | 717/151 |
| 6,981,243 | B1 | * | 12/2005 | Browning et al.| 717/124 |
| 2003/0088854 | A1 | * | 5/2003 | Wygodny et al. | 717/130 |
| 2004/0268325 | A1 | * | 12/2004 | Moore et al.  | 717/140 |

OTHER PUBLICATIONS

Burns, "Cross-Debugging Real-Time Ada Programs", Fall 1987, ACM SIGAda Ada Letters vol. VII, Issue 6, pp. 21-23.*
Dasgupta, "A Probe-Based Monitoring Scheme for an Object-Oriented, Distributed Operating System", Nov. 1986, ACM SIGPLAN Notices, vol. 21, Issue 11, pp. 57-66.*
Tolmach et al., "Debugging Concurrency Extensions for Standard ML", ACM 1991, pp. 120-131.*
Goswami, "An introduction to KProbes", Apr. 18, 2005, lwn.net, pp. 1-5, http://lwn.net/Articles/132196/.*
Cohen, "Dynamic Linux Kernel Instrumentation with SystemTap", Red Hat, Inc., Apr. 28, 2006, pp. 1-25, http://people.redhat.com/wcohen/systemtap20060428.pdf.*

* cited by examiner

*Primary Examiner* — Anna Deng
*Assistant Examiner* — Chih-Ching Chow
(74) *Attorney, Agent, or Firm* — Andrea Bauer; Hoffman Warnick LLC

(57) ABSTRACT

A method for testing a software product comprises initiating a breakpoint in the software product, and executing a probe routine. The executing of the probe routine comprises creating a single step state stack, and repetitively; identifying data to be protected, disabling interrupts, writing the data to the single step state stack, enabling interrupts, restoring a state according to the single step state stack, and single-stepping a probe instruction, until the instructions in the probe are completed.

12 Claims, 5 Drawing Sheets

TESTING A SOFTWARE PRODUCT BY INITIATING A BREAKPOINT AND EXECUTING A PROBE ROUTINE

FIELD OF THE INVENTION

This invention relates to a method for testing a software product, and to an apparatus and a computer program product for testing a software product.

BACKGROUND OF THE INVENTION

The complexity of modern computer software is such that extensive testing of any new computer software is undertaken before the software can be considered to be sufficiently stable to be used, for example as a commercial product. An essential component of the software testing is the debugging of a program to identify and remove any faults in the operation of the software. One known technique applied in debugging is the use of a breakpoint. A breakpoint is the intentional stopping of a computer program for debugging purposes. This is used as a means of ascertaining information about the execution of the software, for example identifying what data is written to where in memory and so on.

A more advanced and complex use of a breakpoint is to exploit the breakpoint with a probe, or probing routine. Dynamic probing comprises a breakpoint with associated pre- and post-processing routines that may be inserted or removed from the software product's run-time code, as and when desired. To support this generalized capability a testing environment needs to interrupt the normal execution of the probed program; execute the pre-processing probe management code; single-step the probed instruction; and execute the post-processing probe management code.

Pre- and post-processing must run at the highest privilege level if they are to operate with the greatest level of flexibility in terms of data gathering. Interception of a probed instruction before and after its execution is provided though the processor architecture in the form of interrupts (sometimes purpose built debugging interrupts). This complex mechanism has been exploited by IBM's Dynamic Probes for Linux (dprobes) and other similar facilities; however, to limit complexity, the entire process from pre-processing, single-stepping and post-processing is always executed with input/output interrupts disabled. (Linux is a trademark of Linus Torvalds in the United States, other countries, or both.)

The disadvantage resulting from disabling interrupts during the entire probing process is an impact on performance: the probed instruction is replaced by a potentially long and complex series of instructions that operate as an autonomic entity. Enabling interrupts would minimise the performance impact of the probing process. However, this raises the need to solve the following problems.

First, how to preserve and restore the probe processing state while the probed instruction is being single-stepped. Where application code is probed, single-stepping potentially involves a transition from a high level of privilege (system or kernel privilege) to a low or user level for the following reason: In order to avoid compromising system integrity and security, the single-stepped instruction is executed with the privileges that would have applied under normal processing where a probe had not been inserted; Under processor architectures that afford protection mechanisms—operating system from applications and applications from each other—carefully architected mechanisms are provided such that a transition from kernel to user space and vice versa will not compromise system integrity.

One such mechanism is to disallow in general the ability of high privilege level code from calling user (or low) privilege code. Subroutine calling requires state saving such that the calling program may resume successfully; if the kernel (highest level of privilege) were to call a program in user-space (lowest level of privilege) then kernel state may have to be exposed to user-space and therefore subject unexpected alteration by a low-privilege program; but equally, user-space programs require little or no system administration or vetting to install; in a situation where the kernel calls user-space the potential for having the called program subverted or unexpectedly substituted exists.

The need to transfer control to a low privilege level from a higher level is often solved by permitting only the use of a return mechanism. This is certainly true of the IA32 architecture. RETURN, being the mechanism for completing a CALL—i.e. effecting transfer back to a caller—mandates the restoration of state and the discarding of that saved state. To use RETURN as means of "calling" user-space from the kernel requires a mechanism to be created for saving state—the opposite to that which is normally done. Because single-stepping has to be effected using a return process (for example using the IRET instruction of the IA32 architecture) it is necessary to solve the need to preserve state over a return process.

Secondly, if the probe processing state were to be preserved during the single-step, then enabling the system to be operated normally during the period over which the probed instruction is single-stepped presents the possibility for recursions through the probe management process due to probes being inserted in interrupt handling routines. Thirdly, if recursion occurs because of timer interrupts then the possibility of thread pre-emption also occurs.

The problem that is required to be solved is the ability to single-step a machine instruction (without user intervention) while allowing the processor to be enabled for interrupts, if desired, in the context of a dynamic probe point. This applies in particular to dynamic probing technologies, such as dprobes and kprobes for Linux, DTRACE for OS/2 and dtrace for Solaris and so forth. (OS/2 is a trademark of International Business Machines Corporation in the United States, other countries, or both. Solaris is a trademark of Sun Microsystems, Inc. in the United States, other countries, or both.)

SUMMARY OF THE INVENTION

According to a first aspect of the present invention, there is provided a method for testing a software product, comprising: initiating a breakpoint in the software product; and executing a probe routine having instructions, the executing comprising: creating a single step state stack, and repetitively: identifying data to be protected; disabling interrupts; writing the data to the single step state stack; enabling interrupts; restoring a state according to the single step state stack; and single-stepping a probe instruction; until the instructions in the probe are completed.

According to a second aspect of the present invention, there is provided an apparatus for testing a software product, comprising: a probe routine having instructions; and a processor arranged to initiate a breakpoint in the software product, and to execute the probe routine, the executing comprising: creating a single step state stack, and repetitively: identifying data to be protected; disabling interrupts; writing the data to the single step state stack; enabling interrupts; restoring a state according to the single step state stack; and single-stepping a probe instruction; until the instructions in the probe are completed.

According to a third aspect of the present invention, there is provided a computer program product on a computer readable medium for testing a software product, the computer program product comprising program code for initiating a breakpoint in the software product and for executing a probe routine having instructions, the executing comprising: creating a single step state stack, and repetitively: identifying data to be protected; disabling interrupts; writing the data to the single step state stack; enabling interrupts; restoring a state according to the single step state stack; and single-stepping a probe instruction; until the instructions in the probe are completed.

Owing to the invention, it is possible to provide a method of single-stepping through a probe routine's instructions while allowing interrupts to be enabled, before, during and after the probe's instructions are single-stepped. This supports a more accurate probing tool, and therefore debugging process, as the normal operation of the processor architecture is more closely mimicked. By creating a single step state stack for a specific probe and pushing data onto the stack before each instruction is single-stepped, the correct data state can always be restored after an interruption and when the processor returns to the thread operating the probe.

The single step state stack comprises a fixed-size last-in-first-out (LIFO) stack data structure and a top-of-stack pointer, and the step of restoring a state according to the single step state stack includes using the top-of-stack pointer to locate the correct entry in the single step state stack.

The testing method further comprises identifying when the single step state stack is full, and accordingly maintaining disablement of interrupts throughout the probe routine. The testing method can monitor the filing of the single step state stack, and if there is no free space to write to the stack, then interrupts will be disabled, allowing the probe routine to be completed, without any failures occurring.

The testing can further comprise executing one or more additional probe routines, each execution including creating a respective single step state stack. By supporting multiple probes, all of which can be interrupted, by using a single step state stack for each probe routine, a very effective and efficient debugging process can be achieved.

BRIEF DESCRIPTION OF THE DRAWINGS

Embodiments of the present invention will now be described, by way of example only, with reference to the accompanying drawings.

DETAILED DESCRIPTION OF THE INVENTION

Figure 1:
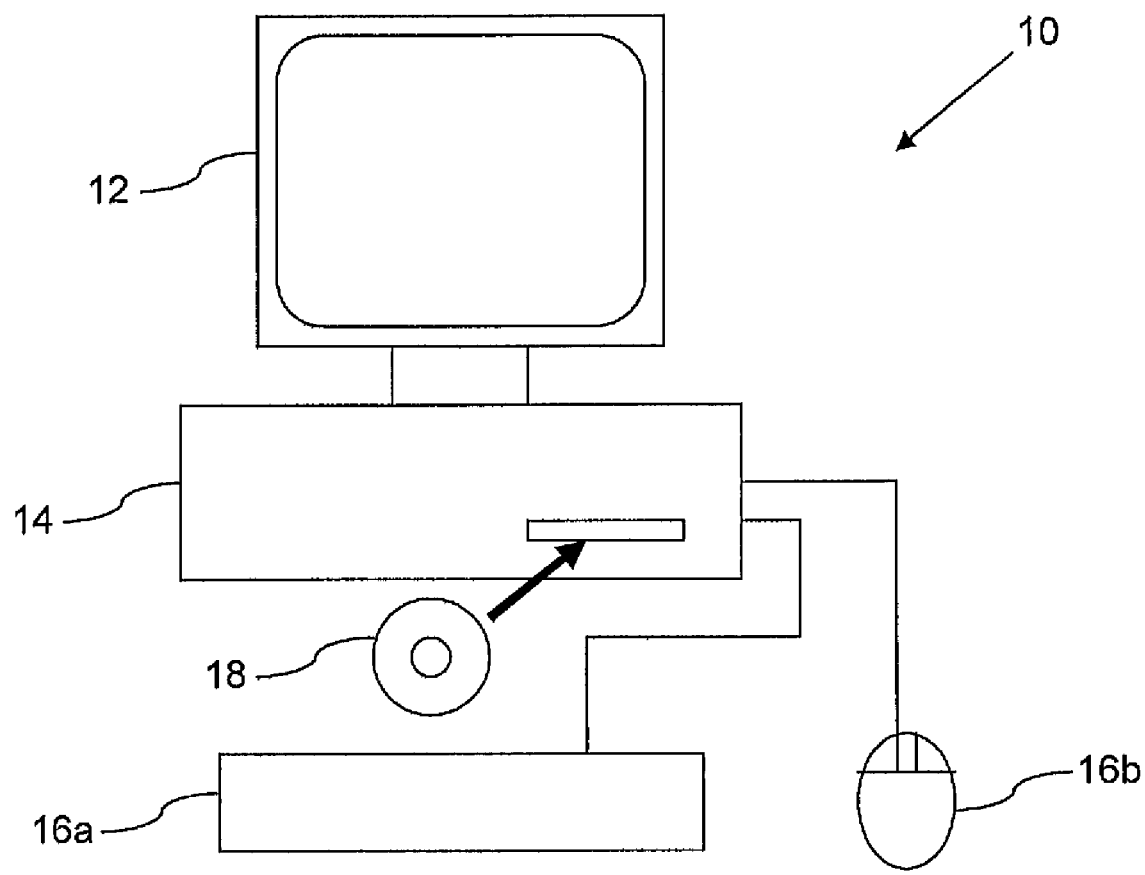
FIG. 1 is a schematic diagram of a software testing environment in accordance with an embodiment of the present invention.

A software testing environment 10 in accordance with an embodiment of the present invention is shown in FIG. 1. The software testing environment 10 includes a display device 12, a processing system 14 connected to the display device 12, and user input devices 16 connected to the processing system 14. The user input devices 16 can comprise, for example, a keyboard 16a and a computer mouse 16b. A computer program product on a computer readable medium 18 is provided which includes instructions for operating the software testing environment 10 in accordance with the present invention. The software testing environment 10, which can include a conventional desktop computer (PC), can be used to test a software product and can display information relating to the operation of a debugging program.

Figure 2:
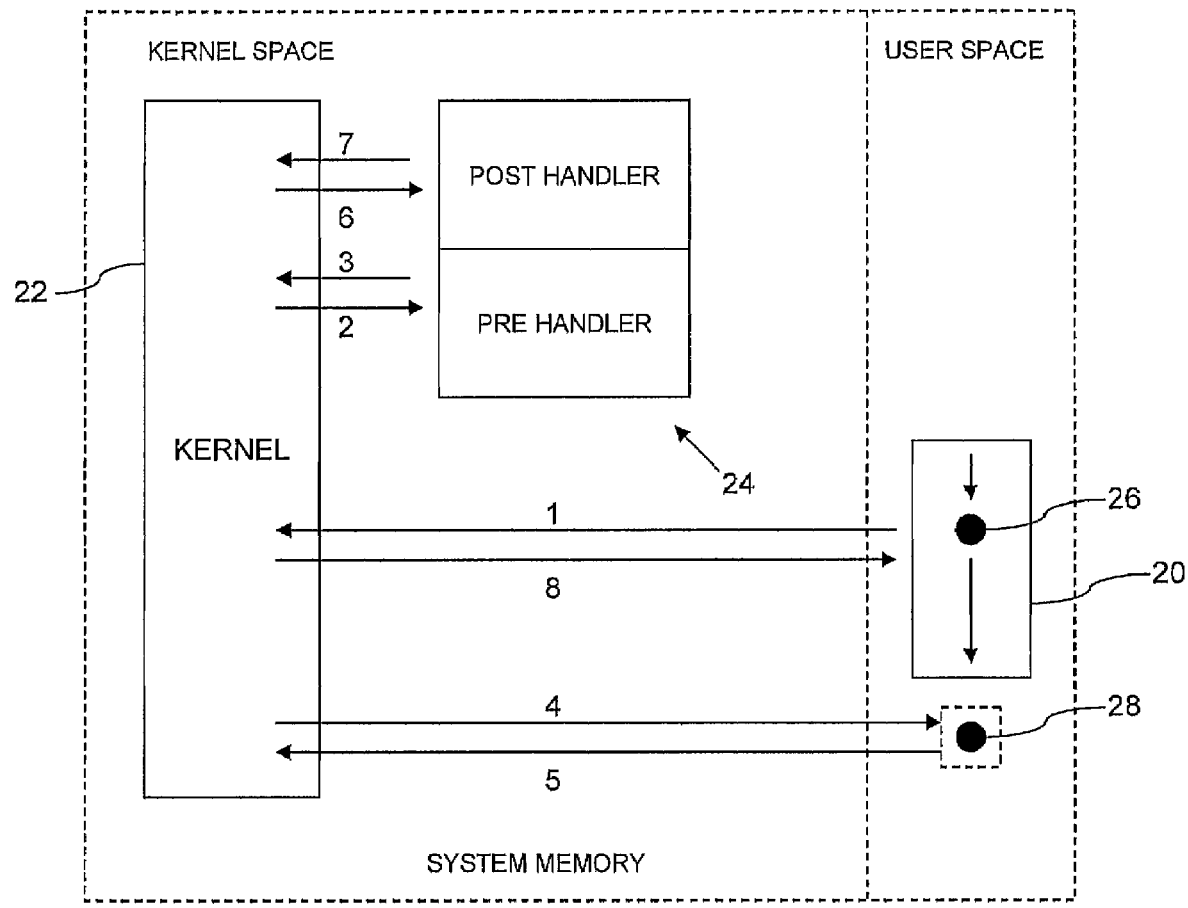
FIG. 2 is a schematic diagram of basic probe components in accordance with an embodiment of the present invention.

FIG. 2 shows the basic processing of a probe in user-space, in accordance with an embodiment of the present invention. The set-up comprises a user-space program 20, the operating system kernel 22, a probe handler 24 with pre- and post-processing routines, an inserted probe point 26, and a copy of the original instruction at the probed location 28. The user-space program 20 executes and encounters the probe point 26, which under the IA32 architecture is implemented as an INT3 instruction. The INT3 instruction causes execution to transfer (1) to the kernel 22 via its software interrupt handling interface. The kernel 22 calls the pre-processing routine (2) of the probe handler 24. Here, data is collected and other actions specific to the probe are performed. The pre-processing routine returns to the kernel (3) and then the kernel 22 prepares to single-step the original instruction that has been replaced by the INT3.

To affect the single-step, the kernel 22 returns to a copy of the original instruction (4) by using an IRET instruction. On completion of the single-step, the kernel 22 is called immediately via an interrupt mechanism (5) to signal completion of the single-step. Necessary adjustments are made for the fact that the instruction that was single-stepped was not at its original location. Control then passes using a CALL instruction (6) to the post-processing routine of the probe handler 24. Here, specific actions pertaining to post-processing of the probed instruction will be performed. The probe handler 24 returns to the kernel (7) which in turn returns (8) to the application program 20 in user-space.

The following discussion is concentrated on a single processor implementation, as shown in FIGS. 1 and 2. The generalization for a multi-processor environment requires that probe processing state data is maintained in per-processor data structures. Data structures described below are assumed to be implemented per-processor in a multi-processor environment unless explicitly otherwise stated.

The problems associated with implementing a probe process that must be enabled for interrupts is addressed by implementing a global LIFO stack data structure (referred to as the single step state stack or SSSS) that comprises a fixed-size LIFO table of equal sized entries and a pointer to the last used stack entry (referred to as top-of-stack pointer or TOS pointer).

When operating a dynamic probe according to this principle, it is necessary to identify the temporary (or local) data that must be protected during the single-step operation. Once this is known, the processor disables interrupts and then proceeds to push the identified data onto the SSSS at the next available empty entry. The TOS pointer is updated accordingly.

If this entry in the SSSS is the last available stack entry, then at this point, the processor explicitly does not enable interrupts during the single stepping. In this case, the testing method proceeds in the standard manner and make the necessary adjustments to the interrupt state before finally returning to the probed code. This is the standard technique adopted in dprobes for Linux and DTRACE for OS/2. The testing for the last entry of SSSS being used permits a practical implementation, because in practice memory resources will be finite.

In the case where the SSSS is not full, then the testing method can proceed with the single stepping by restoring the state of the probed instruction as would have been the case where no probe had been in place. In other words, interrupts are enabled if the probed instruction would normally have executed this way.

During and after single step the process may be interrupted. The consequence of this will be discussed below. However, eventually the system will be re-entered when notification that the single stepping operation has completed is given. At this point interrupts are disabled and the TOS pointer is used to locate the last used stack entry. From this it is possible to restore the probe-processing state data and adjust the TOS pointer accordingly thus effectively freeing the last used SSSS entry. Processing continues in the normal manner, for example as used by dprobes for Linux or DTRACE for OS2.

If recursion occurs because of timer interrupts then the possibility of thread pre-emption also occurs. This problem highlights the possibility of the SSSS entry order becoming invalid if thread pre-emption is allowed to occur after saving state and before restoring it. There are two options for dealing with this.

Firstly, it is possible to disable pre-emption prior to storing data on the stack and before restoring the oldest stack entry. This may readily be done. Most multi-threading operating systems require a simple mechanism for signalling when it is safe to permit pre-emption and then it is not. In the case of Linux a pre-emption counter is incremented. Other operating systems may use this technique or set a purposely defined scheduler control flag.

Disabling pre-emption will allow recursion though interrupts on the same thread context as the original probe. It will not allow other threads to become active (on the same processor) while entries exist in the SSSS. Since interrupts are processed in the LIFO manner, so the entries of the SSSS will be processed in a LIFO manner should processing of an interrupt result in encountering another probe.

A second possibility is to allocate an SSSS for every thread context (instead of per CPU). As part of the thread context switch the processor also switches the SSSS. Interrupts within the same thread context will cause the probe state data to be stacked in a LIFO manner. Context switches will not affect the validity of the stack entry ordering since separate stacks are used for each thread context.

This is needed because if it were possible to save probe state on some form of LIFO stack structure to cater for recursion then the correct ordering of stack entries is invalidated by pre-emption. An example of this can be seen by referring to FIGS. 3a and 3b.

Figure 3A:
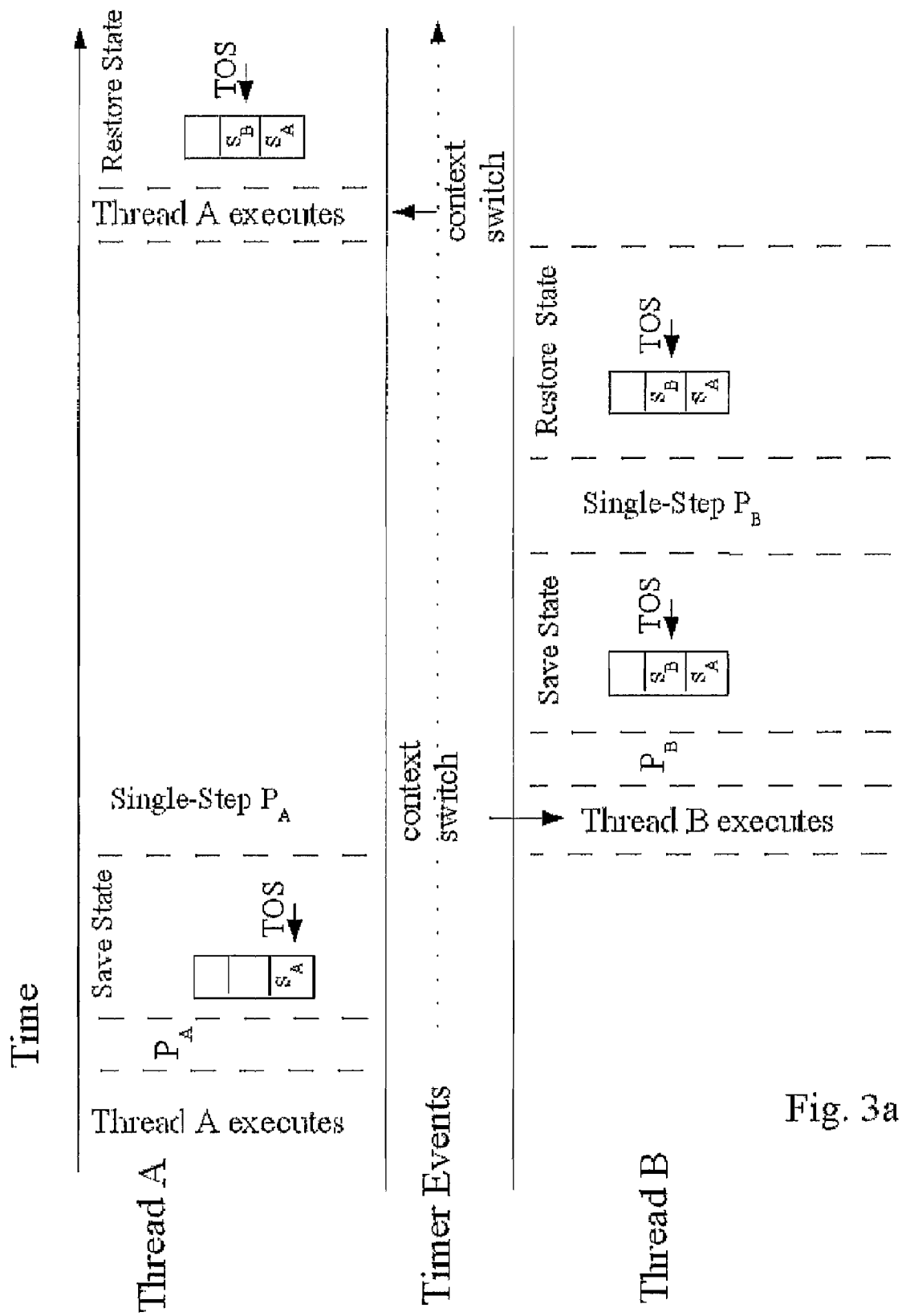
FIGS. 3a and 3b show illustrative event timings while single-stepping instructions on two threads in accordance with an embodiment of the present invention.

Here the timing of events relating to two threads (A and B) is shown. In addition, timer events driven by the regular ticking of the system clock are also shown. Each thread has a single probe inserted $P_A$ and $P_B$. FIG. 3a shows events where processing of the two threads is interleaved in such a way that single-stepping completes without switching thread context. These events may be summarized as follows:

Encounter probe $P_A$;
Save probe processing state $S_A$;
Schedule single stepping of probe $P_A$'s instruction;
Timer interrupt occurs;
Thread context switch to thread B;
Encounter probe $P_B$;
Save probe processing state $S_B$;
Schedule single stepping of probe B's instruction;
Single-step completes;
State for probe $P_B$ is restored;
Timer interrupt;
Thread context switch to thread A;
Single-step for $P_A$ completes; and
State for probe $P_A$ is restored.

Figure 3B:
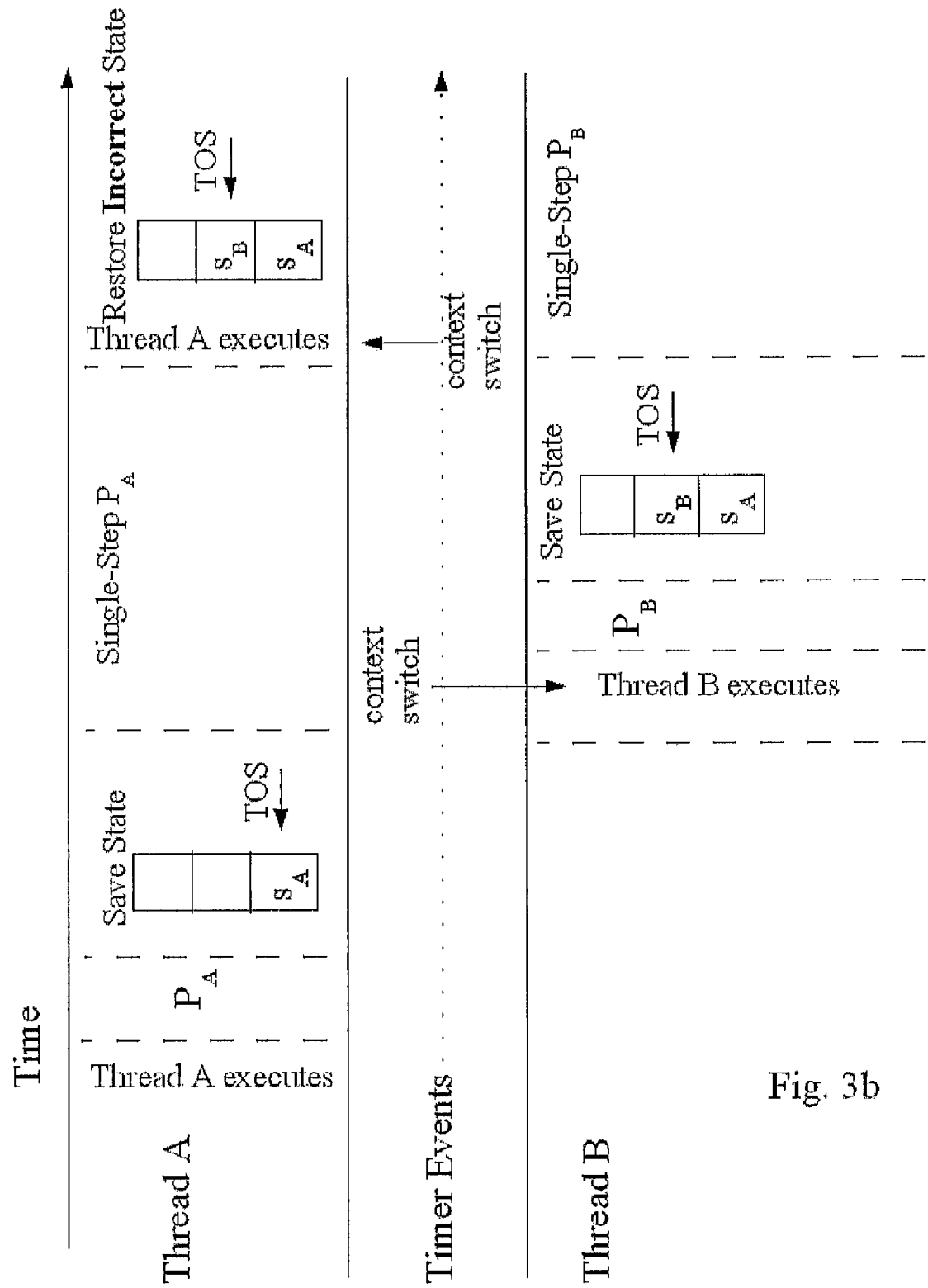

Now compare this with the case where the context switch back from thread B to A occurs before the probe B's state $S_B$ is restored, as shown in FIG. 3b. When thread A receives control for the second time, and attempts to restore state following single-stepping probe $P_A$, an incorrect state will be restored.

In this example, the most recently saved state is that of probe B. If on the other hand, had probe B single-stepping not been interrupted with a context switch then the processor would have found the correct state, namely that of probe B. It is therefore the case that if multiple probes are used (or could possibly occur), then probe specific single step state stacks should be used to ensure that the restoration of the probe state matches the probe being executed, when the processor returns to the thread of a specific probe.

Figure 4:
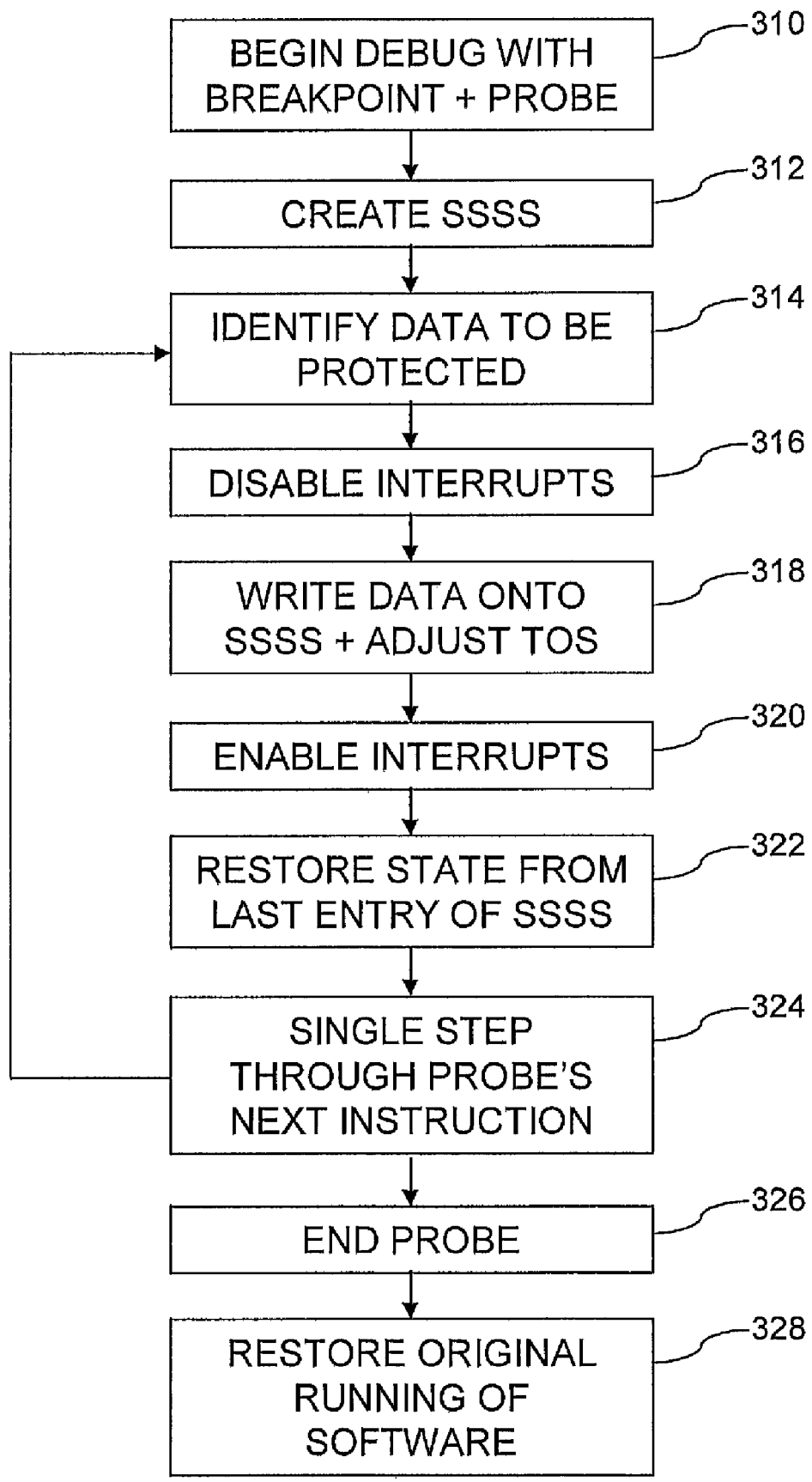
FIG. 4 is a flowchart of a method of testing a software product in accordance with an embodiment of the present invention.

FIG. 4 summarises a method of software testing in accordance with an embodiment of the present invention, from the point of view of a single probe routine. The method for testing the software product comprises: initiating a breakpoint in the software product; and then executing a probe routine (step 310). The executing comprises: creating (step 312) the single step state stack; and then repetitively: identifying (step 314) the data to be protected; disabling interrupts (step 316); writing the data (step 318) to the single step state stack; enabling interrupts (step 320); restoring the state according to the single step state stack (step 322); and single-stepping (step 324) a probe instruction; until the instructions in the probe are completed. Once all of the instructions in the probe routine are single stepped, then the probe is terminated (with associated post-processing if applicable) at step 326, and the software product can continue to execute (step 328).

The processing system 14 in FIG. 1 can include a computer infrastructure that is capable of performing the various process steps described herein. The computer infrastructure can include a computer system that comprises a processing unit for executing computer program code, a memory, at least one input/output (I/O) interface, and a bus. Further, the computer system can be in communication with at least one external device and a storage system. While executing computer program code, the processing unit can read and/or write data from/to the memory, storage system, and/or I/O interface(s). The bus provides a communication link between each of the components in the computer system. The external device(s) can comprise any device (e.g., a display) that enables a user to interact with the computer system or any device that enables the computer system to communicate with one or more other computer systems.

The computer system can comprise any general purpose computing article of manufacture capable of executing computer program code installed by a user (e.g., a personal computer, server, handheld device, etc.). However, it is understood that the computer system is only representative of various possible computer systems that may perform the various process steps of the invention. To this extent, in other embodiments, the computer system can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure is only illustrative of various types of computer infrastructures that can be used to implement the present invention. For example, in one embodiment, the computer infrastructure comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that the invention further provides various alternative embodiments. For example, in one embodiment, the invention provides a computer-readable medium that includes computer program code to enable a computer infrastructure to carry out and/or implement the various process steps of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory and/or storage system (e.g., a fixed disk, a read-only memory, a random access memory, a cache memory, etc.), and/or as a data signal travelling over a network (e.g., during a wired/wireless electronic distribution of the program code).

In another embodiment, the invention provides a business method that performs the process steps of the invention on a subscription, advertising, and/or fee basis. A service provider can create, maintain, support, etc., a computer infrastructure, such as the computer infrastructure, that performs the process steps of the invention for one or more customers. In return, the service provider can receive payment from the customer(s) under a subscription and/or fee agreement and/or the service provider can receive payment from the sale of advertising space to one or more third parties.

In still another embodiment, a computer infrastructure, such as the computer infrastructure, can be obtained (e.g., created, maintained, having made available to, etc.) and one or more systems for performing the process steps of the invention can be obtained (e.g., created, purchased, used, modified, etc.) and deployed to the computer infrastructure. The deployment of each system can comprise one or more of (1) installing program code on a computer system, such as the computer system, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

The invention claimed is:

1. A method for testing a software product, comprising:
encountering a probe point in the software product;
transferring execution to a system kernel upon encountering the probe point;
calling, by the system kernel, a probe handler to execute a probe routine having instructions; and
executing, by the probe handler, the probe routine, the executing comprising:
creating a single step state stack, and sequentially and repetitively:
identifying probe state data to be protected;
disabling interrupts;
writing the probe state data to the single step state stack;
enabling interrupts;
restoring a probe state according to the probe state data in the single step state stack; and
single-stepping a probe instruction;
until the instructions in the probe are completed;
wherein the testing can further comprises executing one or more additional probe routines, each execution including creating a respective single step state stack;
wherein all of the additional probe routines can be interrupted, by using the respective single step state stack for each additional probe routine, and
wherein the single step state stack comprises a fixed-size last-in-first-out (LIFO) stack data structure and a top-of-stack pointer.

2. The method according to claim 1, wherein the step of restoring a state according to the single step state stack further comprises using the top-of-stack pointer to locate a correct entry in the single step state stack.

3. The method according to claim 1, further comprising:
identifying when the single step state stack is full, and accordingly maintaining disablement of interrupts throughout the probe routine.

4. The method according to claim 1, further comprising:
executing at least one additional probe routine, each execution including creating a respective single step state stack.

5. Apparatus for testing a software product, comprising:
a probe routine having instructions; and
a processor arranged to encounter a probe point in the software product, to execute a system kernel upon encountering the probe point, the system kernel calling a probe handler to execute the probe routine, the executing of the probe routine comprising:
creating a single step state stack, and sequentially and repetitively:
identifying probe state data to be protected;
disabling interrupts;
writing the probe state data to the single step state stack;
enabling interrupts;
restoring a probe state according to the probe state data in the single step state stack; and
single-stepping a probe instruction;
until the instructions in the probe are completed;
wherein the testing can further comprises executing one or more additional probe routines, each execution including creating a respective single step state stack;

wherein all of the additional probe routines can be interrupted, by using the respective single step state stack for each additional probe routine; and wherein the single step state stack comprises a fixed-size last-in-first-out (LIFO) stack data structure and a top-of-stack pointer.

6. Apparatus according to claim 5, wherein restoring a state according to the single step state stack further comprises using the top-of-stack pointer to locate a correct entry in the single step state stack.

7. Apparatus according to claim 5, wherein the processor is further arranged to:

identify when the single step state stack is full, and accordingly maintaining disablement of interrupts throughout the probe routine.

8. Apparatus according to claim 5, wherein the processor is further
arranged to: execute at least one more additional probe routines, each execution including
creating a respective single step state stack.

9. A computer program product on a non-transitory computer readable medium for testing a software product, the computer program product comprising program code for:

encountering a probe point in the software product;
transferring execution to a system kernel upon encountering the probe point;
calling, by the system kernel, a probe handler to execute a probe routine having instructions; and
executing a probe routine having instructions, the executing comprising:
creating a single step state stack, and sequentially and repetitively:
identifying probe state data to be protected;
disabling interrupts;
writing the probe state data to the single step state stack; enabling interrupts;
restoring a probe state according to the probe state data in the single step state stack; and
single-stepping a probe instruction;
until the instructions in the probe are completed;
wherein the testing can further comprises executing one or more additional probe routines, each execution including creating a respective single step state stack;
wherein all of the additional probe routines can be interrupted, by using the respective single step state stack for each additional probe routine; and
wherein the single step state stack comprises a fixed-size last-in-first-out (LIFO) stack data structure and a top-of-stack pointer.

10. The computer program product according to claim 9, wherein the program code for restoring a state according to the single step state stack further comprises program code for using the top-of-stack pointer to locate a correct entry in the single step state stack.

11. The computer program product according to claim 9, further comprising:

program code for identifying when the single step state stack is full, and for accordingly maintaining disablement of interrupts throughout the probe routine.

12. The computer program product according to claim 9, further comprising:

program code for executing at least one additional probe routine, each execution including creating a respective single step state stack.

* * * * *